United States Patent
Wu et al.

(10) Patent No.: US 7,761,915 B2
(45) Date of Patent: Jul. 20, 2010

(54) TERMINAL AND RELATED COMPUTER-IMPLEMENTED METHOD FOR DETECTING MALICIOUS DATA FOR COMPUTER NETWORK

(75) Inventors: Chun-Te Wu, Yun-Lin Hsien (TW); Te-Wei Ho, Chi-Lung (TW); Shir-Hung Wang, Taipei (TW)

(73) Assignee: ZyXEL communications Corp., Hsinchu Science Park, Hsinchu (TW)

( * ) Notice: Subject to any disclaimer, the term of this patent is extended or adjusted under 35 U.S.C. 154(b) by 1106 days.

(21) Appl. No.: 11/306,445

(22) Filed: Dec. 28, 2005

(65) Prior Publication Data

US 2007/0147239 A1 Jun. 28, 2007

(51) Int. Cl.
G06F 11/00 (2006.01)
G06F 12/16 (2006.01)

(52) U.S. Cl. .................. 726/22; 726/26; 713/164; 370/230; 370/235; 370/401

(58) Field of Classification Search .................. None
See application file for complete search history.

(56) References Cited

U.S. PATENT DOCUMENTS 5,623,600 A * 4/1997 Ji et al. ..................... 726/24
2003/0154399 A1 * 8/2003 Zuk et al. .................. 713/201
2007/0209070 A1 * 9/2007 Yadav ....................... 726/14

FOREIGN PATENT DOCUMENTS

| EP | 1 122 932 A2 | 8/2001 |
| EP | 1 335 559 A2 | 8/2003 |
| FR | 2 867 004 A1 | 9/2005 |
| JP | H11-167487 | 6/1999 |
| JP | H11513153 | 11/1999 |
| JP | 2001256045 | 9/2001 |
| JP | 2004-078648 | 3/2004 |
| JP | 2004287790 | 10/2004 |
| JP | 2005-011369 | 1/2005 |
| TW | 594472 | 6/2004 |
| WO | WO 9712321 | 4/1997 |

* cited by examiner

Primary Examiner—Nasser Moazzami
Assistant Examiner—Fikremariam Yalew
(74) Attorney, Agent, or Firm—Winston Hsu

(57) ABSTRACT

A computer-implemented packet detection method includes a source at a first address transmitting packets to a terminal at a second address without transmitting the packets to any intermediate address during the transmission, the terminal receiving the packets, the terminal reassembling the received packets; the terminal performing a process referring to the reassembled packets, and the terminal transmitting packets to a destination at a third address which is different from the first address without transmitting the adjusted packets to any intermediate address during the transmission. Without extra operations and packet traffic, the computer-implemented packet detection method can be applied to virus detection, malicious content detection, or some statistics.

26 Claims, 4 Drawing Sheets

TERMINAL AND RELATED COMPUTER-IMPLEMENTED METHOD FOR DETECTING MALICIOUS DATA FOR COMPUTER NETWORK

BACKGROUND OF THE INVENTION

1. Field of the Invention

The present invention generally relates to a terminal and a related computer-implemented method for detecting malicious data, and more specifically, to a terminal and a related computer-implemented method for detecting a malicious data with reduced operations and decreased packet traffic.

2. Description of the Prior Art

With the rapid development in the computer industry, the widespread proliferation of computers prompts the development of computer networks that allow computers to communicate with each other. One significant computer network that has become the preferred data communication medium for a broad class of computer users is the Internet, commonly known as the "world-wide web", or WWW. A broad class of computer users, ranging from private individuals to large multi-national corporations, now routinely employs the Internet to access information, to distribute information, to correspond electronically, and even to conduct personal conferencing.

One particular problem that has plagued many computer applications results from malicious data, and the increased popularity of computer network just makes the situation more serious. Malicious data include the software that destroys or deletes data, makes computer systems intrudable or controllable by invalid users, or steals data, such as virus, computer worms, Trojan horses, key Loggers, Spywares, and etc. Malicious data may also refer to fake data, data for cheating, or data of a huge volume that brings inconvenience to users or computer systems. Internet fishing, SPAMs, and SPIT(Spam over Internet Telephony) belong to the second category.

Some individuals have developed malicious data that may hinder the operation of computers. Whether a virus is intended simply as a practical joke or a planned attack on a computer network, vast amounts of damage may result. A computer virus is a program that disrupts operations of a computer by modifying other executable programs. A virus may also delete or corrupt crucial system files, user data files or application programs. Additionally, malicious data may make copies of themselves to distribute to other computers connected to a communications network, thereby causing damage to computers at several locations.

The prior art has attempted to reduce the effects of virusand prevent their proliferation by using various virus detection programs. One such virus detection method was disclosed by Ji et al. in U.S. Pat. No. 5,623,600. Ji et al. utilized gateways equipped with proxy servers to perform virus detections for the whole file being transmitted into or out of a network. Please refer to FIG. 1. FIG. 1 is a block diagram of a memory of the gateway of the prior art disclosed by ji et al. in U.S. Pat. No. 5,623,600. The memory 10 of a gateway, coupled to the network by a bus 11, comprises a File Transfer Protocol (FTP) proxy server 12, an operating system 13 including a kernel 14, a Simple Mail Transfer Protocol (SMPT) proxy server 15, and application programs 16 including but not limited to computer drawing programs, word processing programs, and etc. When a file is transferred to and from the gateway node, the kernel 14 receives the file first, and then the destination addresses of packets of the file are changed such that the packets can be transmitted to one of the proxy servers 12 and 15 according to the type of the file afterwards. Assume the file received is a file of FTP type, so it is transmitted to the FTP proxy server 12. The FTP proxy server 12 takes charge of checking if the file composed of the received packets is of a type that may contain viruses. If the file composed of the packets received by the FTP proxy server 12 is considered a safe and clean file, the destination address of the file will be changed again, and the file with the new-changed destination address will be transferred back to the kernel 13 of the memory 10 of the gateway. Similarly, the SMTP proxy server 15 takes charge of checking if the message composed of packets transferred to and from the gateway node is of a type that may contain viruses.

The method of the prior art disclosed by ji et al. in U.S. Pat. No. 5,623,600 installs the proxy servers in the memory of gateway nodes for checking data transferred to and from the protected domain of a given network. However, it requires additional process effort since all packets need to be transferred to a particular proxy server in advance of the original destination.

Another method for detecting malicious data, commonly referred to as signature scanning, scans each transmitted packet individually, searching for code fragments of known patterns used for malicious data. However, it is easy for the method of signature scanning to make false alarms. Hence the error rate is raised and unendurable.

Because of these performance problems and limitations of the prior art, it is desirable to develop a better detecting method, malicious data removal and response mechanism for a computer network.

SUMMARY OF THE INVENTION

It is therefore an objective of the claimed invention to provide a computer-implemented method and a terminal for detecting packets in order to solve the problems in the prior art.

The claimed invention discloses a computer-implemented packet detection method comprising: a source at a first address transmitting packets to a terminal at a second address without transmitting the packets to any intermediate address during the transmission; the terminal receiving the packets; the terminal reassembling the received packets; the terminal performing a process referring to the reassembled packets; and the terminal transmitting packets to a destination at a third address which is different from the first address without transmitting the adjusted packets to any intermediate address during the transmission.

The claimed invention further discloses a terminal for detecting packets in computer network. The terminal includes a reassembly module for reassembling input packets, a processing module for processing packets of a first protocol, and an adjusting module for adjusting the processed packets.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a computer-implemented method for detecting malicious data for computer network. Unlike the conventional virus-detecting method that transfers the packets to proxy servers for searching malicious data, the present invention implements the malicious data detection within the kernel of the terminal, such as a gateway node or a router.

Figure 2:
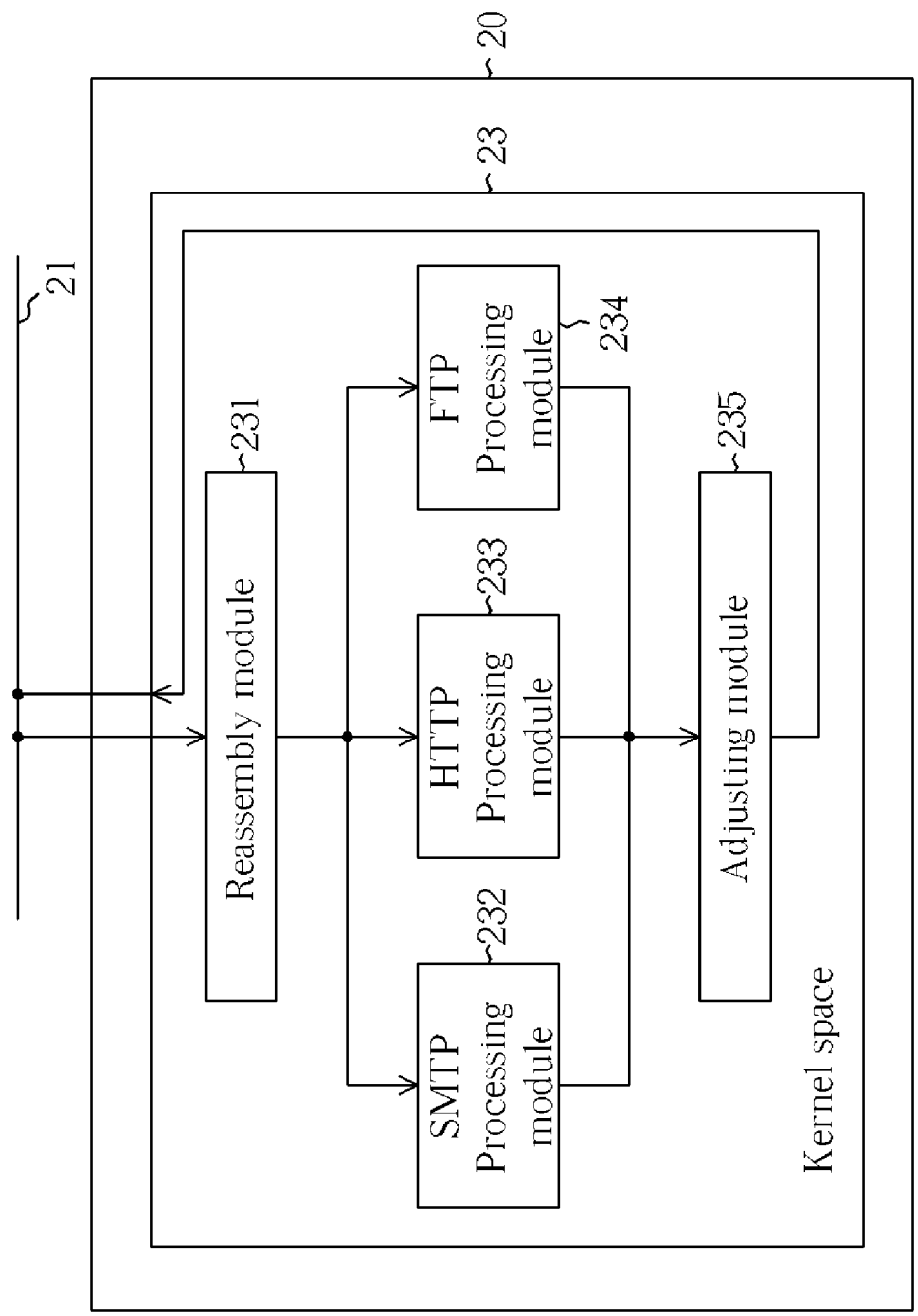
FIG. 2 is a block diagram of a claimed gateway node installed with a virus-detecting method of the present invention.

Please refer to FIG. 2 for a block diagram of a claimed gateway node installed with a virus-detecting method of the present invention. The gateway node 20 is coupled to the computer network by a bus 21. The gateway node 20 comprises a kernel 23 including a reassembly module 231, processing modules 232, 233 and 234 of different protocols, and an adjusting module 235. When packets pass through the gateway node 20, the reassembly module 231 reassembles the input packets and transmits the reassembled packets to one of the processing modules according to the type of the reassembled packets. For example, if the reassembled packets are of a SMTP type, the reassembled packet will be transmitted to the SMTP processing module 232. Similarly, the reassembled packet will be transmitted to the HTTP processing module 233 or the FTP processing module 234 if the reassembled packets are of a HTTP type or of a FTP type.

Since the reassembly module 231 reassembles the input packets, the processing modules 232, 233 and 234 are able to detect malicious data in the reassembled packets and implement some predetermined processes to the packets. The processing module queues the reassembled packets until all packets of a file are received if it is necessary. The processes that are performed when malicious data are detected can be designed by choice. One of the embodiments of the present invention is to output an indication along with the original file when malicious data is detected. Another embodiment of the present invention is to remove the infected paragraphs directly and output the remnants only. The other one of the embodiments of the processes implemented by the processing modules could be deleting the whole file containing the infected packets. Contrarily, if there is no malicious data detected in the processing module, the processing module may be designed to output the original uninfected packets directly, or to output the original packets together with a data-clean indicator. The adjusting module 235 receives packets and/or related information from one of the processing modules 232, 233 and 234. The adjusting module 235 is essential to the claimed invention. In most cases, the adjusting module 235 receives packets and then adjusts the packets, especially the headers of the packets, according to the amendments of those packets, such as the changes of packet lengths and the TCP window sizes. Afterwards, the adjusting module 235 outputs the adjusted packets and transmits the adjusted packets back to their original destination by the bus 21.

According to the aforementioned description of the present invention, it can be seen that, all malicious data detection and related processes are integrated and are implemented within the kernel space of the gateway node of the present invention. That means the packets are not transmitted among different terminals in the network, or other user-space process within the terminal. Every processing module is implemented within the kernel space of one terminal, such as a gateway node or a router of a computer network. Compared to the prior art, there is no need for the present invention to change the destination addresses of the packets. Both the operations and packet traffics are reduced in accordance. The device that is installed with the claimed method of malicious data detection can be a gateway node, a router, or a terminal of any type.

Figure 3:
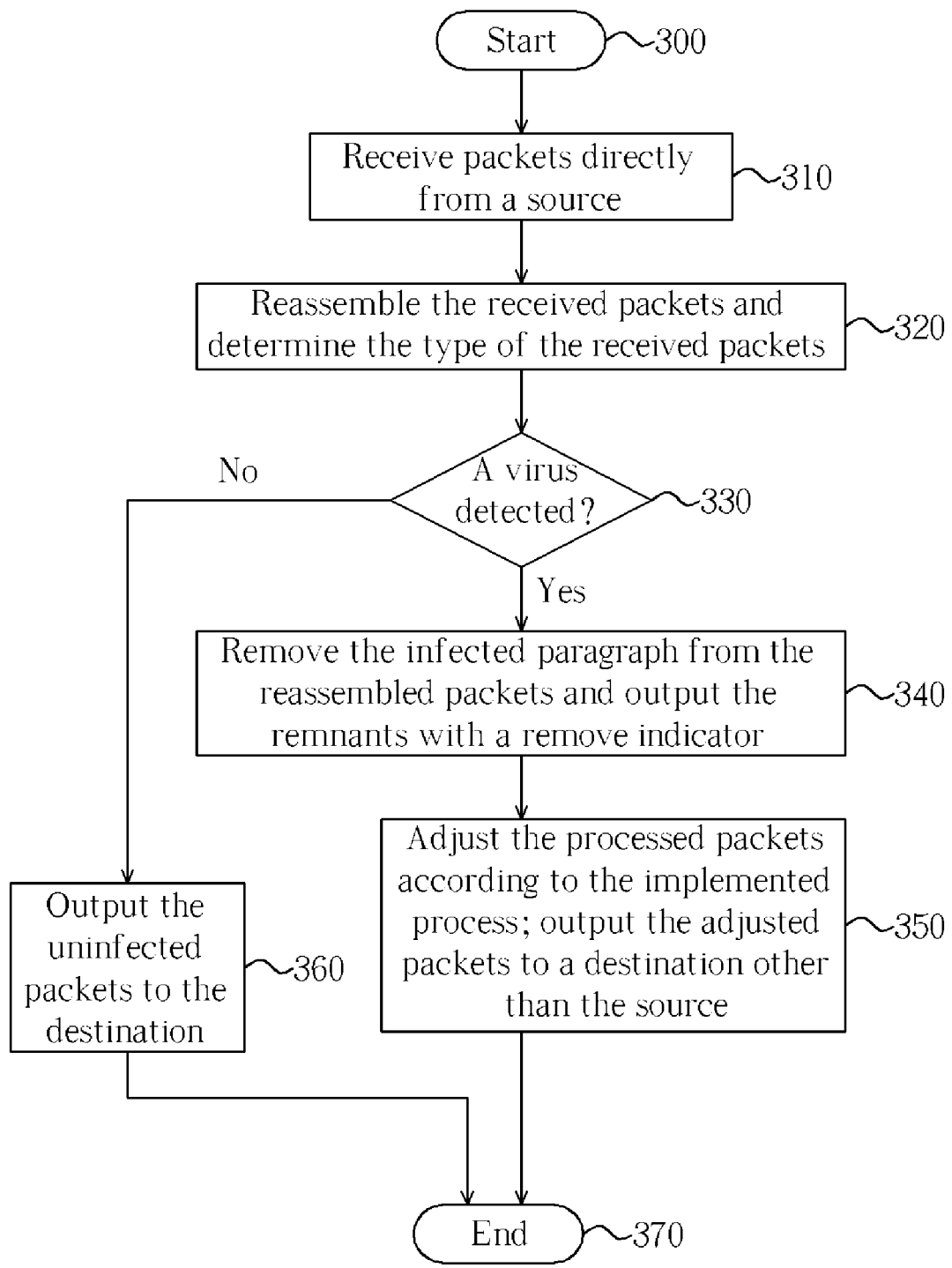
FIG. 3 is a flowchart of the malicious data detection method of the present invention.

Please refer to FIG. 3 for a flowchart of the malicious data detection method of the present invention. In the following, every step is implemented within a terminal, which is used to represent the device that is installed with the claimed method.
 step 300: Start;
 step 310: Receive packets directly from a source;
 step 320: Reassemble the received packets and determine the type of the received packets;
 step 330: Implement a virus detection to the reassembled packets according to the type of the reassembled packets; perform step 340 if a virus is detected, otherwise perform step 360;
 step 340: Remove the infected paragraph from the reassembled packets and output the remnants with an indicator indicating the remove;
 step 350: Adjust the processed packets according to the implemented process, and output the adjusted packets to a destination other than the source;
 step 360: Output the uninfected packets to the destination;
 step 370: End.

In step 320, the method of the present invention determines whether the packets compose an FTP file, a message under SMTP, or a HTTP file, and sends the packets to the processing module of their type. Step 340 can be replaced with other embodiments of the present invention, such as to delete the whole file containing the infected packet, or as to queue the infected packet and announce the existence of virus.

The claimed method can be further applied to checking or filtering packets that contain a certain pattern. For example, the claimed method can be implemented to filter emails containing some predetermined banned words or malicious content. The claimed method may be applied to filter out oversize files or to control the traffic amount of some specific addresses as well. For the former, step 330 in the flowchart illustrated in FIG. 3 can be replaced by "Detect a predetermined pattern in the reassembled packets", and step 340 can be replaced by "Remove the predetermined pattern from the reassembled packets and output the remnants with an indicator indicating the remove". For the latter, the processing modules of the present invention can be further equipped with statistic functions.

The terminal installed with the claimed method can be further coupled to an external device for additional resources. When there is malicious data detected, the processing module can implement the preliminary processing, and bypass those packets to the external device for further processing if it is necessary. For example, the kernel of the router installed with the claimed method may separate an infected email in advance, and then a cooperating device coupled with the router can take over the infected email and performs some advanced processing, such as blocking the sender. The function of the terminal installed with the claimed method can be expanded in this way. In addition, more processing modules of different protocols can be included for handling packets of different types.

Figure 1:
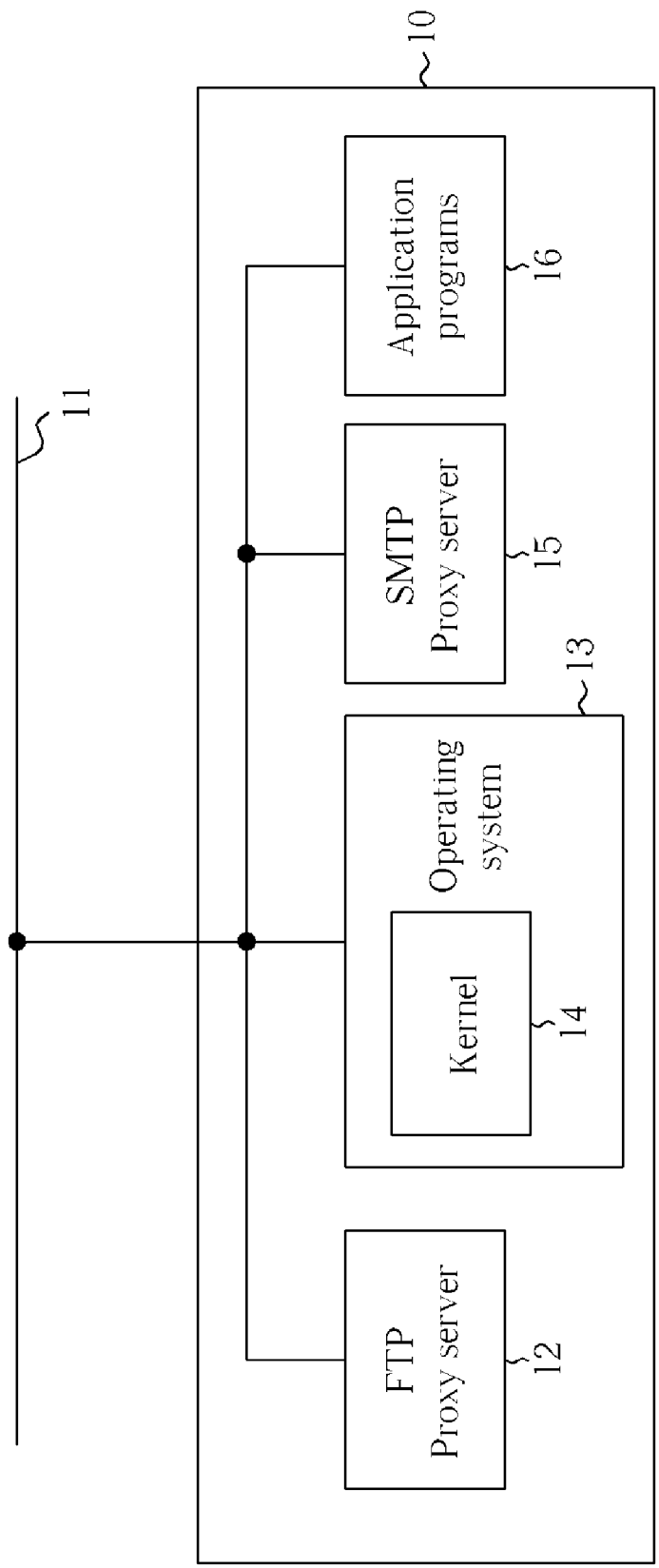
FIG. 1 is a block diagram of a memory of the gateway of the prior art disclosed by Ji et al. in U.S. Pat. No. 5,623,600.
Figure 4:
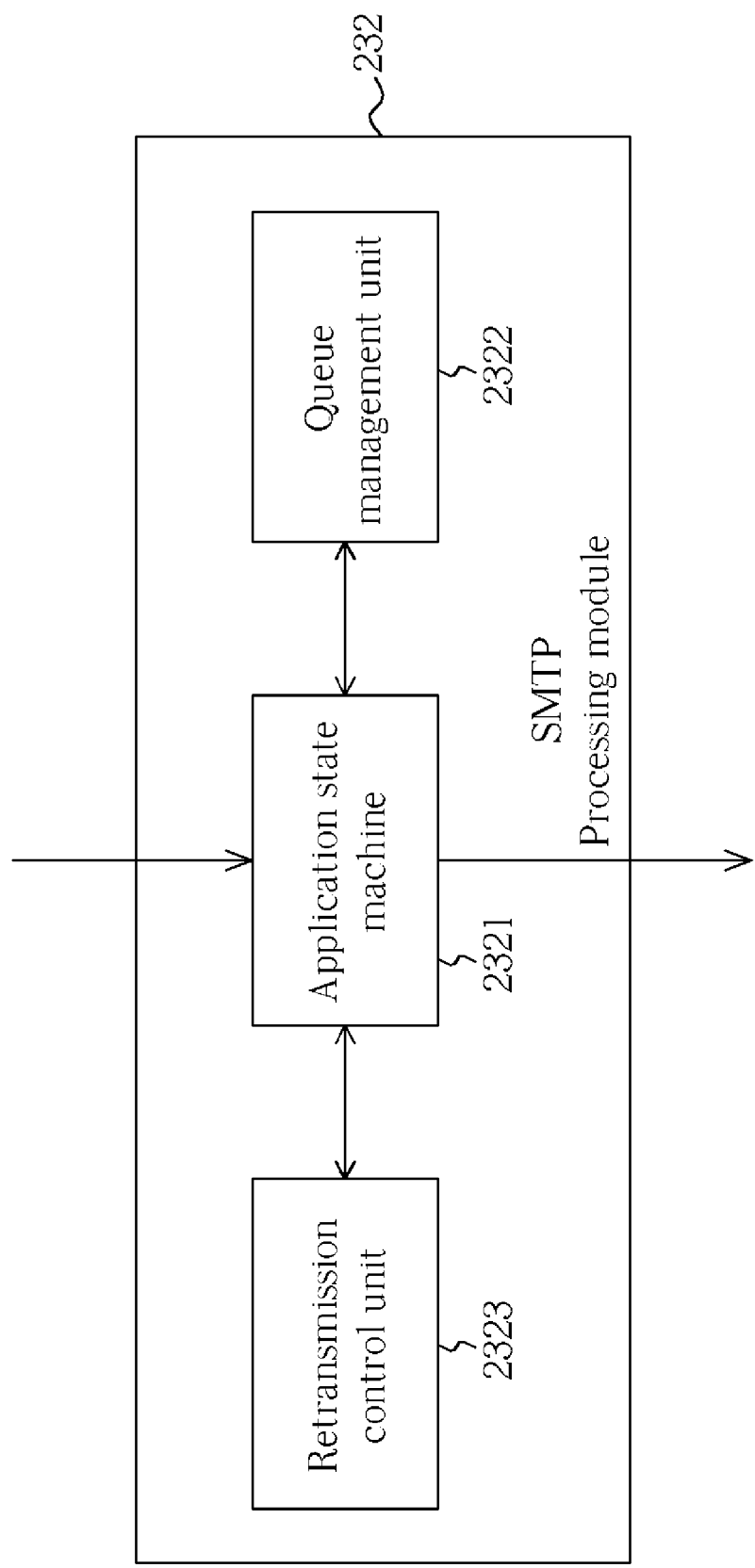
FIG. 4 is a block diagram of the FTP processing module.

The processing module of the claimed terminal can be seen as it includes several units for taking charge of different tasks. Please refer to FIG. 4. FIG. 4 is a block diagram of the SMTP processing module 232 in FIG. 1. As illustrated, the SMTP processing module 232 may be divided into an application state machine 2321, a queue management unit 2322, and a retransmission control unit 2323. The application state machine 2321 receives and processes packets input from the reassembly module. The queue management unit 2322, coupled to the state machine, is for queuing packets input from the state machine 2321 under the direction of the application state machine 2321. The retransmission control unit 2323 is in charge of controlling retransmission of packets when there is a packet lost. However, the block diagram shown in FIG. 4 is an embodiment but not a limitation to the present invention. With no doubts, the method of the present invention could be implemented by hardware or by software, and the tasks can be separated and performed by different circuits and programs in different ways.

The present invention integrates the function of proxy servers in the conventional virus detection method into the kernel of a terminal, such as a router and a gateway node. The most advantage of the present invention is it is no more necessary to transmit packets to proxy servers having a different port or a different address. It is no more necessary to transmit the packets back to the kernel of the gateway node after the virus detection is performed, either. Therefore, the amount of operations and packet traffics are all reduced. The claimed method of detecting packets can be applied to different kinds of packet detection, such as traffic control or banned patterns filtering. Hence a novel terminal and a related method for detecting packets for computer network are achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer-implemented method for detecting packets, the method comprising:
   a source at a first address transmitting packets to a terminal at a second address without transmitting the packets to any intermediate address during the transmission;
   the terminal receiving the packets;
   the terminal reassembling the received packets in a kernel of the terminal;
   the terminal performing a process referring to the reassembled packets in the kernel of the terminal, the process including detecting whether the reassembled packets contain malicious data or a predetermined pattern, and marking or removing at least a part or the reassembled packets when the reassembled packets contain malicious data or the predetermined pattern;
   adjusting packets; and
   the terminal transmitting packets to a destination at a third address which is different from the first address without transmitting the adjusted packets to any intermediate address during the transmission,
   wherein reassembling the received packets, detecting whether the reassembled packets contain malicious data or a predetermined patter, and adjusting the packets all take place in the kernel of the terminal.

2. The method of claim 1 wherein the terminal performing a process referring to the reassembled packets is the terminal detecting if the reassembled packets contain malicious data.

3. The method of claim 2 further comprising the terminal adding a paragraph of code indicating the presence of the malicious data in the reassembled packets when the malicious data is detected in the reassembled packets.

4. The method of claim 2 further comprising the terminal removing the detected malicious data from the reassembled packets.

5. The method of claim 2 further comprising the terminal removing the reassembled packets that contain the malicious data.

6. The method of claim 4 further comprising the terminal generating an indicator indicating the remove of the detected malicious data from the reassembled packets.

7. The method of claim 2 further comprising the terminal transmitting the packets containing the malicious data to another terminal for further processing.

8. The method of claim 1 wherein the terminal performing a process referring to the reassembled packets is the terminal detecting if the reassembled packets contain the predetermined pattern.

9. The method of claim 8 further comprising the terminal adding a paragraph of code indicating the presence of the predetermined pattern in the reassembled packets when the predetermined pattern is detected in the reassembled packets.

10. The method of claim 8 further comprising the terminal removing the predetermined pattern detected from the reassembled packets.

11. The method of claim 10 further comprising the terminal generating an indicator indicating the remove of the predetermined pattern detected from the reassembled packets.

12. The method of claim 1 wherein the terminal performing a process referring to the reassembled packets is the terminal gathering a statistic of the reassembled packets.

13. The method of claim 1 wherein the terminal performing a process referring to the reassembled packets comprises the terminal queuing the reassembled packets.

14. A terminal for detecting packets in computer network, the terminal comprising:
   an input for receiving packets from a bus on the computer network; and a kernel, comprising:
      a reassembly module for reassembling input packets;
      a processing module, coupled to the reassembly module, for processing packets of a first protocol;, wherein processing packets includes detecting whether the packets contain malicious data or a predetermined pattern, and marking or removing at least a part of the packets when the packets contain malicious data or the predetermined pattern; and
      an adjusting module, coupled to the processing module, for adjusting packets,
      wherein reassembling the input packets, detecting whether the packets contain malicious data or a predetermined pattern, and adjusting the packets all take place in the kernel of the terminal.

15. The terminal of claim 14 wherein the processing module comprising:
   a state machine, coupled to the reassembly module, for processing input packets; and
   a queue management unit, coupled to the state machine, for queuing packets input from the state machine.

16. The terminal of claim 15 wherein the processing module comprising a retransmission control unit, coupled to the state machine, for controlling retransmission of packets.

17. The terminal of claim 14 wherein the processing module is for detecting if packets contain malicious data.

18. The terminal of claim 17 wherein the processing module is further for removing the detected malicious data from the packets.

19. The terminal of claim 17 wherein the processing module is further for removing the packets that contain the malicious data.

20. The terminal of claim 17 wherein the processing module is further for generating an indicator referring to the detection of the malicious data.

21. The terminal of claim 14 wherein the processing module is for detecting if packets contain a predetermined pattern.

22. The terminal of claim 21 wherein the processing module is further for removing the predetermined pattern from the packets.

23. The terminal of claim 21 wherein the processing module is further for removing the packets that contain the predetermined pattern.

24. The terminal of claim 21 wherein the processing module is further for generating an indicator referring to the detection of the predetermined pattern.

25. The terminal of claim 21 further comprising another processing module, coupled to the reassembly module, for processing packets of a second protocol.

26. The terminal of claim 25 wherein the reassembly module outputs packets to one of the processing module according to the type of the packets.

* * * * *